United States Patent
Jakob

(10) Patent No.: US 8,915,417 B2
(45) Date of Patent: Dec. 23, 2014

(54) TOOLING FOR FIXING HOOKS CONNECTING THE ENDS OF BELT CONVEYORS

(75) Inventor: Horst Jakob, Deaux (FR)

(73) Assignee: Aser, Saint-Chamond (FR)

( * ) Notice: Subject to any disclaimer, the term of this patent is extended or adjusted under 35 U.S.C. 154(b) by 904 days.

(21) Appl. No.: 12/997,452

(22) PCT Filed: Jun. 11, 2008

(86) PCT No.: PCT/FR2008/000797
§ 371 (c)(1),
(2), (4) Date: Mar. 11, 2011

(87) PCT Pub. No.: WO2009/150307
PCT Pub. Date: Dec. 17, 2009

(65) Prior Publication Data
US 2011/0155779 A1    Jun. 30, 2011

(51) Int. Cl.
*F16G 3/16*   (2006.01)
*F16G 3/04*   (2006.01)
*F16G 3/00*   (2006.01)

(52) U.S. Cl.
CPC . *F16G 3/16* (2013.01); *F16G 3/003* (2013.01); *F16G 3/04* (2013.01)
USPC ............ 227/155; 227/153; 227/140; 227/143; 227/147; 227/110

(58) Field of Classification Search
CPC .............. F16G 3/15; F16G 3/003; F16G 3/04
USPC ............ 227/155, 153, 140, 143, 147, 31, 110; 29/798, 243.51
See application file for complete search history.

(56) References Cited

U.S. PATENT DOCUMENTS

| | | | |
|---|---|---|---|
| 3,142,842 A | | 8/1964 | Neale |
| 4,144,628 A | * | 3/1979 | Schick ................ 29/243.51 |
| 5,368,214 A | * | 11/1994 | Schick ..................... 227/147 |
| 5,544,801 A | | 8/1996 | Schick |
| 5,644,836 A | * | 7/1997 | Schick ....................... 29/798 |
| 6,739,038 B2 | * | 5/2004 | Herold ....................... 29/798 |

FOREIGN PATENT DOCUMENTS

| | | |
|---|---|---|
| DE | 41 40 743 A1 | 6/1993 |
| DE | 43 36 998 A1 | 5/1995 |
| FR | 2 378 615 A2 | 8/1978 |
| FR | 2 722 266 A1 | 1/1996 |
| FR | 2 916 506 A1 | 11/2008 |

\* cited by examiner

*Primary Examiner* — Michelle Lopez
(74) *Attorney, Agent, or Firm* — Blank Rome LLP

(57) ABSTRACT

Tooling intended for fixing hooks connecting the ends of belt conveyors including a fixed lower part forming an anvil linked to a movable upper part by positioning and centering fingers, a main punch, and a complementary punch. The main punch includes a head provided with enlarged parts and can slide in a vertical channel. The complementary punch can slide in a vertical channel. A vertical guiding groove staple is arranged on the side of the complementary punch. A pneumatic hammer provided with a head hammers the main punch which drives the staple in and drives, or hammers, the complementary punch which simultaneously hammers the upper of the hook.

11 Claims, 4 Drawing Sheets

US 8,915,417 B2

TOOLING FOR FIXING HOOKS CONNECTING THE ENDS OF BELT CONVEYORS

REFERENCE TO RELATED APPLICATION

The present application is the U.S. national phase of PCT International Patent Application No. PCT/FR2008/000797, filed Jun. 11, 2008, published on Dec. 17, 2009, as WO 2009/150307 A1, whose disclosure is hereby incorporated by reference in its entirety into the present disclosure.

1. Field of the Invention

The present invention aims at improving tooling for fixing hooks connecting the ends of belt conveyors.

2. Description of Related Art

In the prior art hooks are known for connecting a belt conveyor of the type including an upper plate and a lower plate joined by lugs intended to be fixed to the opposite ends of a belt conveyor to form series of lugs overhanging the respective end of the conveyor belt and liable to be imbricated together when said opposite ends are placed closer to each other, with the lugs of a series of hooks fixed to one of the opposite ends and the lugs of the other series fixed to the other ends of the opposite ends being then joined by a linking rod going through said imbricated lugs. Such hooks are most often fixed to the ends of the considered conveyor belt, using metal staples provided with prongs which successively go through the upper part of the hooks through holes provided therefor, then the conveyor belt and then the lower plate through holes also provided for this purpose, to be folded and thus provide the fixing of the hooks. Various folding methods are known in the art, including modes wherein prongs of the staples are folded not under the lower face of the hook but under bridges provided in the upper face of the lower plate of the hook. For positioning such fixing staples, conventional manual hammers were used and are still used for hitting the back of the staples and for closing the hooks against the ends of the conveyor belt so as to press the upper and lower plates against the upper and lower faces of the conveyor belt whereas the staples are driven in and folded.

Such manual operations require a very skilled manpower and however the positioning thus executed is far from being perfect because of the strength of the hammering and the positioning of such hammering cannot be controlled with accuracy.

A German patent DE 41 40 743 C2 provided for tooling making it possible to wedge the end of the conveyor belt bearing staples engaged astride a rim thereof, on a lower part of the tooling being used as the anvil and to hit with a hammer a punch received in an upper part of the tooling, itself positioned and guided by fingers engaged in holes of the lower part and in holes of the upper part of the tooling. The perfectly positioned and guided punch could drive the staples in to fix the hook on the end of the conveyor belt by being hit with a hammer.

Pneumatic or electric devices have also being provided for guiding, positioning and hitting the lugs for the positioning thereof with such devices being controlled so as to provide a hitting force controlled by anticipation, with a frequency of hits also controlled by anticipation. The publication (Offenlegungsschrift) for the German application DE 43 36 998 A1 shall also be referred to since it is an extension of the development of patent DE 41 40 743 C2.

The device mentioned in the publication DE 43 36 998 A1 is shown in detail in FIG. 1 of this publication.

The prior art tooling is the closest to the present invention. It includes a lower part 3 including an anvil integral with a base 28. Such anvil is so arranged to receive one of the hooks provided astride on one end 2 of the belt conveyor, with the lugs 11 of the hooks being aligned using an alignment rod 15 going through the lugs and the alignment holes provided in embosses 12 of the lower part 3.

On the left side (in the figure) of the lower part 3 of the tooling several vertical positioning and guiding holes are provided, with one of which being visible in the figure. Such positioning and guiding holes are used for receiving guiding fingers 17 (only one of which is visible in the figure) which are engaged in the positioning and guiding holes provided in the upper part 4. It should be noted that both parts are then perfectly aligned and that the upper part 4 can slide upward or downwards as it is guided by the fingers 9.

Staples 7 including a back and two prongs are engaged with capping into holes provided in the upper plate of the hook.

The upper part 4 includes a vertical guiding channel vertically aligned with the anvil of the lower part 3. The guiding channel includes a punch 6 provided with a head. Such punch 6 can slide upwards and downwards in the vertical guiding channel. The stroke thereof is limited downwards by the head which is moved in an enlarged part of the guiding channel in the punch.

The pneumatic or electric hammer hits, by means of a hitting slider 25 which may be omitted, the head of the punch 6 which enables to drive in the staple 7 and to fix the hook, the upper plate of which is folded against the upper face of the conveyor belt because of the initial capping of the staples in the holes of the upper plate.

However, the results obtained with the tooling according to the patent DE 41 40 998 A1 as those obtained with the tooling according to the publication DE 43 36 998 A1 were not satisfactory. As a matter of fact, the part of the upper plate between the lugs and the staple was not correctly flattened against the upper face of the conveyor belt because it had not been hammered but simply driven in.

SUMMARY OF THE INVENTION

This is the reason why the present invention has been made in order to provide perfectly positioned hooks fixed with no clearance. The existence of clearance is extremely prejudicial to the durability of staples which tend to go off with the strong tractions which they are submitted to. In addition, the presence of reliefs gives hold to the scrapers used to clean the conveyor belt from material debris. In this case, hooks can be torn away too.

The solution of such problems is obtained by adding in a tooling of the type included in the publication (Offenlegungsschrift) for the application of German patent number DE 43 36 998 A1 in addition to the punch acting as mentioned above on the staples, with a second punch or complementary punch which plays a double part, i.e. guiding the staple and hitting the upper face of the hook, with the hitting being obtained during the operation cycle by the coupling of the hitting of the main punch and that of the complementary punch, such hitting being carried out either using a hammer as in the prior patent DE 41 40 743 C2 or using a pneumatic or electric device as in publication DE 43 36 998 A1 mentioned above. Two means used to obtain said coupling of punch hitting will be examined hereinunder.

This complementary punch is mounted to run free in a vertical channel provided along the main punch. The potential stroke thereof is limited by a protrusion arranged in such vertical channel from the side of the channel located opposite the main punch. The complementary punch includes two shoulders, an upper shoulder and a lower shoulder disposed on either side of the protrusion, i.e. the distance separating both shoulders from the complementary punch is greater than the dimension of the protrusion in the vertical direction. It should be understood that the potential clearance of the complementary punch in the vertical direction is measured by the difference between this distance and said dimension of the protrusion. It should be understood too that the complementary punch is thus trapped in the channel with the only freedom of movement thereof being a sliding in the vertical direction.

It should be understood that the complementary punch may, at the limit of the main punch stroke, be hit by a shoulder of the head of the main punch which hits the apex of the complementary punch. In the case where the head of the main punch includes no shoulder on the complementary punch side, the latter may be hit either directly, simultaneously with the main punch or through an intermediate slide positioned between both punches and a hitting head of a pneumatic or electric hammer. Hitting with a hand hammer is also being considered using a hitting slider going out of the upper part which, when it is hit by the hammer, hits the main punch and then, at the limit of the stroke thereof, hits the main punch, then at the limit of the stroke the complementary punch. The main punch can also be extended while providing the head thereof with a shoulder located above the apex of the complementary punch as explained hereabove so that this extension going out of the upper part of the tooling can be hit with a manual hammer.

The results of these various hitting methods are identical as regards the hitting of the part of the upper face of the upper plate between the lug and the staple, with the best result being obtained with a pneumatic or an electromechanical hammer, the hitting strength and the frequency of which can be adjusted as taught in publication DE 43 36 998 A1.

BRIEF DESCRIPTION OF THE DRAWINGS

The invention will now be described in greater details with respect to the drawing which shows the preferred embodiment of the invention.

DETAILED DESCRIPTION OF THE PREFERRED EMBODIMENTS

Figure 1:
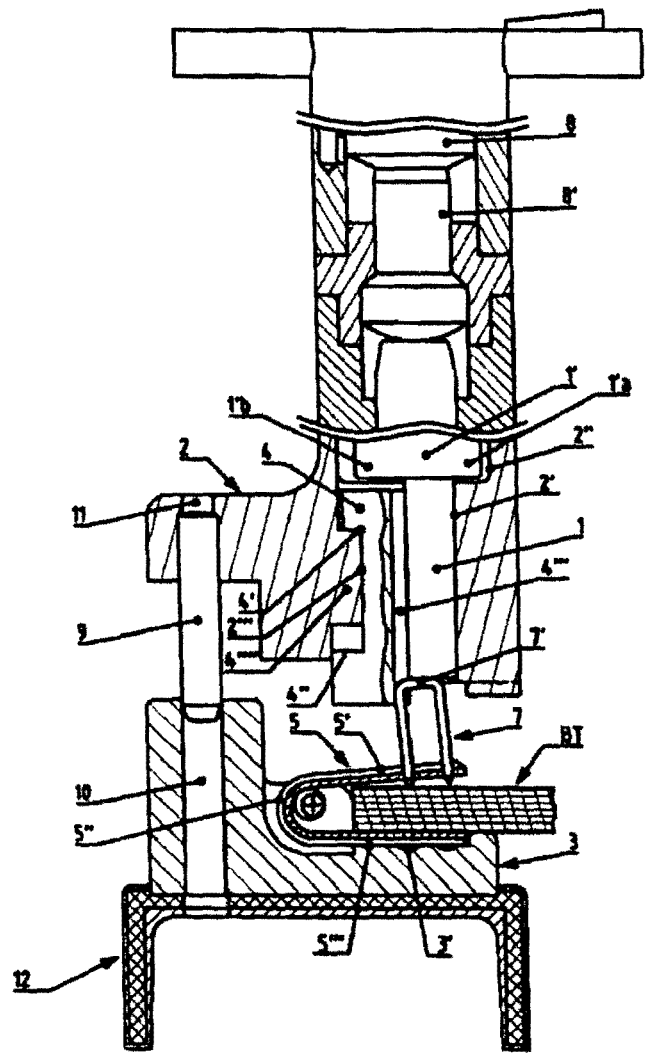
FIG. 1 is the cross-sectional view of tooling according to the invention, along a vertical plane parallel to the longitudinal plane in the middle of the end of the conveyor belt engaged in the tooling with a view to being provided with hooks fixed using staples and during the first step of the fixing of the hook.

FIG. 1 shows a partial cross-section of one of the embodiments of the invention. The tooling shown at the first step of the fixing of the hook 5 on the end of the conveyor belt BT using a staple 7 includes a fixed lower part 3 positioned on a base 12 and a vertical movable upper part 2. Both parts are connected by fingers 9 (only one of which is visible in the figure). Such fingers are at least in the number of two, preferably three, and they are driven into wedging holes 10 and 11 respectively provided in the lower part 3 and the upper part 2. The wedging holes 10 and 11 are perpendicularly aligned with the plane in the figure (i.e. only one pair of holes and only one wedging finger are shown in the figure with the other ones being behind these) and parallel to the provided alignment into the anvil 3' of the lower part with a view to receiving the rim of the end of the conveyor belt bearing the hooks 5 to be fixed.

On the right side of the figure, the upper part 2 of the tooling includes a vertical guiding channel 2'intended to guide a main punch 1. Another vertical guiding channel 2' is provided in the upper part 2 of the tool. This channel enables the complementary punch 4 to slide and to position it vertically close to the guiding channel 2' of the main punch, on the left (in the figure) of such guiding channel 2'. It should be noted that the complementary punch 4 includes an upper shoulder 4" and a lower shoulder 4'. The shoulders aim at limiting the motions of the complementary punch 4 downwards and upwards while cooperating with the protrusion 2"" of the lower part 2 of the tooling which penetrates into the guiding channel of the complementary punch. Such protrusion 4"", which has a shape matching that of the space left free between both shoulders 4' and 4" except from the fact that the height thereof is smaller, enables a clearance of the complementary punch 4 in the vertical direction upwards and downwards while preventing the complementary punch 4 from sliding out of the upper part 2 of the tool.

A vertical guiding groove 4'" positioned on the side of the complementary punch 4 which is close to the guiding channel 2' of the main punch 1 should also be noted, on the right side of the figure of the complementary punch. Such groove is shown separately in the figure. It should be noted in FIG. 1 that the back 7' of the staple and the start of one of the branches thereof is at this initial step slightly engaged into this groove 4'".

The complementary punch 4 is the novelty brought by the invention. At the top of the upper part 2 of the tooling a pneumatic hammer is provided, the hitting head 8 of which may contact the main punch 1 either directly or indirectly through a hitting slider 8'. The main punch 1 includes, at the top thereof, a head 1' consisting in an enlargement which can slide in an enlarged part 2" of the guiding channel 2'. In the embodiment shown in FIG. 1, the head 1' overhangs on the right side by forming a shoulder 1'a, which can rest at the limit of the stroke of the punch 1 against the bottom of the enlarged part 2" of the guiding channel 2. The function of this shoulder is to enable limiting the stroke of the main punch 1 downwards. Accessorily, it can also prevent the main punch 1 to slide downwards out of the tool. On the left side, in FIG. 1, the head 1' is enlarged and forms a shoulder 1'b located above the complementary punch. In another embodiment which is not shown in the figure, the head 1' is not enlarged above the complementary punch 4 which can thus be flush with the level of the apex of the head 1' of the main punch 1, with the stroke being authorised up there. How this embodiment also enables to drive in the staple and to tighten accurately the upper plate of the hook against the upper face of the belt conveyor shall be mentioned hereinafter with the explanations on the operation of the punches 1' and 4. At the initial step shown in FIG. 1, it should be noted that the end of the conveyor belt BT, bearing a hook 5 engaged astride the rim of said end with the lower plate 5'" of the hook being wedged in the recess of the anvil 3 in the upper plate 5' still being oblique to be able to thread the hook 5 bearing a staple 7 engaged with capping into the holes provided in the upper plate 5', with the prongs slightly exceeding the lower face of the upper plate 5'. Thus, the back 7' of the staple is slightly disengaged on the one hand under the main punch 1 in contact therewith and on the other hand in a vertical groove 4''' provided on the right side (in the figure) of the complementary punch 4 which is in the lower position and held by the shoulder 4'.

The tooling is then ready to be operated to fix the hook using a staple on one end of the conveyor belt. It should be noted that, with a view to simplifying the description a singular is used for the staple and the lug and, of course, a staple is considered as only one staple of a series of staples engaged on the rim of one end of the conveying belt and several staples can be used on the same hook.

Figure 2:
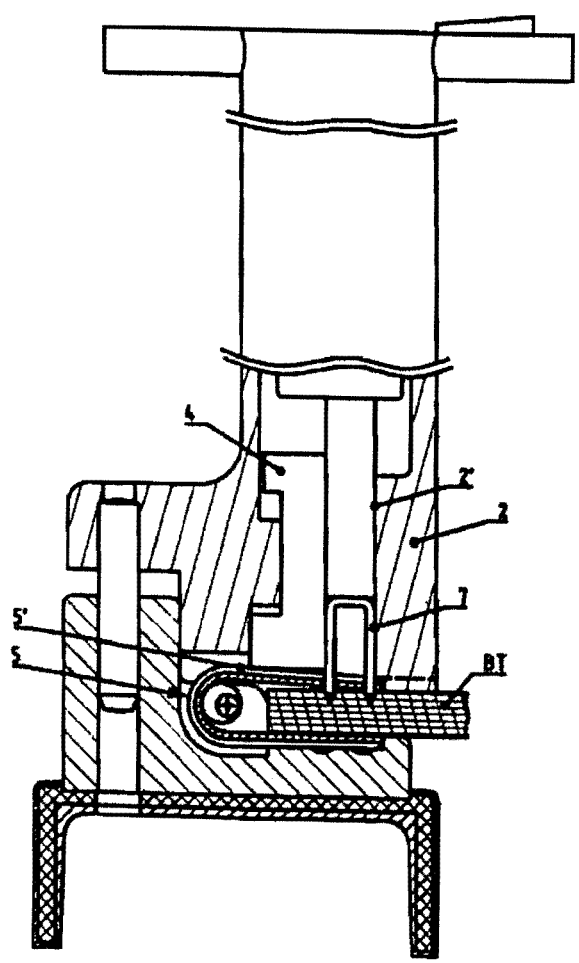
FIG. 2 is a partial cross-sectional view of the same device according to the same plane as that of the cross-section in FIG. 1, during the second step of the fixing of the hook with the hook being folded against the upper face of the end of the conveyor belt and the staple not being driven in yet.

FIG. 2 also shows the same elements as in FIG. 1. The pneumatic hammer has been operated and the staple 7 slid into the channel 2' of the upper part 2 which went down because of its own weight and accompanies the down motion of the upper plate 5' of the hook 5 which came in contact with the upper face of the conveyor belt BT in the part bearing the staple 7, with the staple 7 having driven the upper face 5' because of capping into the holes of the upper plate 5. The staple 7 has slightly sunk into the material of the belt conveyor. At this step, the complementary punch 4 is not active yet, it follows the motion by remaining against the upper face of the upper plate 5' of the hook 5 without being positively driven in, with the staple being guided into the guiding groove 4'''.

Figure 3:
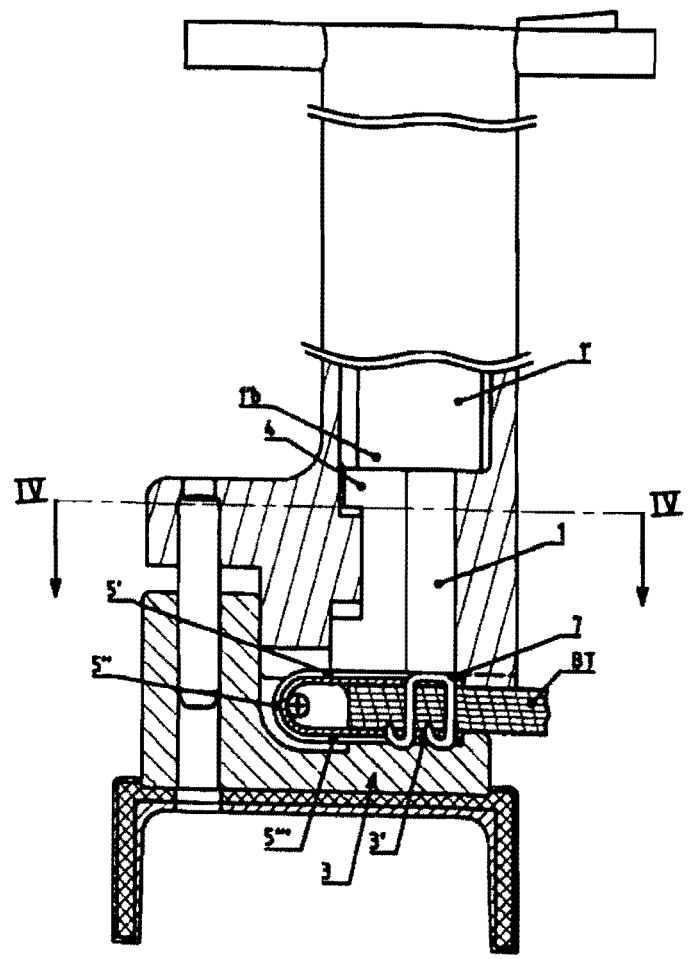
FIG. 3 is a partial cross-sectional view according to the same plane as that of the cross-sections in FIGS. 1 and 2, with the staple being driven in, the prongs thereof being folded and the upper face of the hook being perfectly pressed against the upper face of the end of the conveyor belt without leaving any protrusion between the lug and the staple.

FIG. 3 shows the completion of the fixing operations. The staple 7, under the effect of the hammering of the main punch 1, is completely driven into the thickness of the conveyor belt BT. As it is well guided, it met the holes of the lower plate 5''' of the hook and the prongs thereof are folded on the recesses of the anvil 3. Simultaneously, with the last part of the stroke of the main punch 1, the left shoulder 1'$b$ (in the figure), formed by the head 1' of the main punch, met the apex of the complementary punch 4 which started being hammered because of such a shoulder 1'$b$ of the main punch and it itself hammered, as a consequence, the part of the upper face of the upper plate 5' of the hook 5 between the lug 5" and the staple 7 by pressing it perfectly. Such combined hammering of the staple 7 and the hook 5 results in a perfect tightening of the hook.

Figure 4:
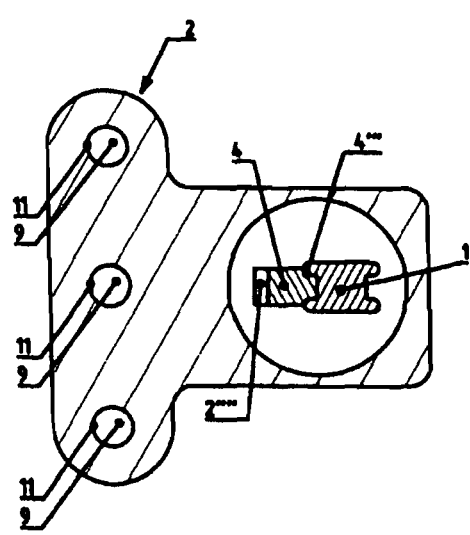
FIG. 4 is a cross-section of the upper part 2 according to line IV-IV in FIG. 3.

FIG. 4 is a horizontal cross-section along line IV-IV in FIG. 3 showing in a plane all the above-mentioned elements bearing the same references as in the other figures, from the upper part 2 of the tooling till the medium height area. 3 holes 11, 3 positioning and guiding fingers 9 (only one of which is shown in FIGS. 1, 2, and 3) can be noted thereon. The complementary punch 4, the main punch 1 also in cross-section and the protrusion 2'''' which limits the clearance upwards and downwards of the complementary punch 4, as well as the guiding groove of the complementary punch 4 can also be seen therein.

It should be noted that the description was made with a pneumatic hammer as the hitting element. However, it is evident that tooling using a complementary punch according to the invention can be used with any hitting element including a manual hammer, an electric hammer or a hydraulic hammer.

In the version wherein the punch head 1 is enlarged only on the right side (in the figure), the pneumatic hammer hitting head can hit directly both punches 1 and 4 as soon as the staple 7 has been driven in sufficiently so that the apex of the complementary punch is flush with the apex of the head of the main punch.

Then, the invention provides very efficient and light tooling with no mechanical, electric or electronic difficulty which meets at best the requirements exposed at the beginning.

The invention claimed is:

1. Tooling for fixing hooks connecting the ends of a belt conveyor of the type including an upper plate (5') and a lower plate (5''') connected by lugs (5"), positioned on the ends of a conveyor belt (BT), with the lugs (5") being able to be connected after having being imbricated, by a linking and swivel rod, like a hinge, said tooling including a movable upper part (2) and a fixed lower part (3) positioned and centered with respect to each other by positioning and centering means, with the upper part (2) being able to vertically slide towards or away from the lower part (3), the lower part (3) including an anvil (3') and wedging means for the lower plate (5''') of a hook (5) positioned between the upper part (2) and the lower part (3), the upper part (2) including a vertical channel (2') for receiving a main punch (1) substantially centered above the anvil (3') and being able to be hammered, using a manual hammer or a device of the pneumatic, electromechanical or hydraulic hammer type mounted in the upper part, to drive in staples (7) engaged with capping into holes provided in the upper plate (5') of a connection hook (5) positioned astride on a rim of one end of the conveyor belt (BT) positioned between the upper part (2) and the lower part (3), then in the material of the end of the conveyor belt, with prongs thereof being further folded either under the lower plate (5''') of the hook (5) and meeting recesses having an appropriate shape provided in the anvil (3') of the lower part (3) or under a bridge or bridges provided in the lower plate (5''') of the hook (5) with the upper part of the lower plate (5''') of the hook playing the part of an anvil, with a lower face of the lower plate (5''') of the hook resting on the anvil of the lower plate which, in the later case, is smooth, the upper part (2) including a second vertical channel (2'41) in which a complementary punch (4) is mounted so as to be able to slide in this channel (2''') parallel to the main punch (1) while being juxtaposed next to the main punch (1), and being able to be hammered, using the manual hammer or the device of the pneumatic, electromechanical or hydraulic hammer type mounted in the upper part (2) of the tooling, wherein the complementary punch (4) is positioned so that a lower end thereof is located above a part of the upper plate (5') of the hook (5) located between the lugs (5") and a branch of the staple (7) which is the closest to the lugs (5"), wherein a vertical dimension of the complementary punch (4) is substantially equal to a vertical dimension of the main punch (1), when the main punch (1) has driven the staple and applied the part of the upper plate (5') of the hook (5) located under the staple (7) against an upper face of the end of the conveyor belt (BT), apexes of both the main and complementary punches are at the same level and are hit together by the manual hammer or the pneumatic, electromechanical or hydraulic hammer.

2. Tooling according to claim 1, characterized in that the main punch (1) includes a head (1') which forms an enlarged part (1'$a$) on a side opposite the side where the complementary punch (4) is located, with said enlarged part (1'$a$) being movable in an enlarged part (2") of the channel (2') when the main punch (1) is moved.

3. Tooling according to claim 2, wherein the main punch (1) includes a head (1') which forms an enlarged part (1'$b$) on the side where the complementary punch (4) is located, said enlarged part (1'$b$) being above an apex of the complementary punch (4) at a distance which varies according to the respective movements of the two punches (1) and (4) in the respective channels (2') and (2''') thereof.

4. Tooling according to claim 3, wherein the complementary punch (4) includes an upper shoulder (4') and a lower shoulder (4") on the side thereof positioned opposite the main punch (1) and in that a protrusion (2"") protrudes into the vertical channel (2''') for guiding the complementary punch (4) in the space between the two shoulders (4') and (4") of the complementary punch (4) with the dimension of said protrusion (2"") in the vertical direction being smaller than that of said space also in the vertical direction of said space so that the upper shoulder (4') rests on the protrusion (2''') when the complementary punch (4) is in the lower position, a position wherein a vertical guiding groove (4''') arranged in the complementary punch (4), in the side thereof which is directed towards the main punch (1) can receive the upper part of a staple (7) engaged with capping into the holes of the upper plate (5') of a hook (5) held in the tooling astride the rim of one end of the conveyor belt (BT), with the upper plate (5') thereof, then being inclined with respect to the upper face of the conveyor belt (BT).

5. Tooling according to claim 3, wherein a pneumatic, electromechanical or hydraulic hammer is mounted in the upper part (2) of the tooling, so that a hitting head (8) can hit, or rather hammer, the main punch (1) either directly or through a hitting slider (8') mounted between the hitting head (8) and the main punch (1).

6. Tooling according to claim 3, wherein the main punch (1) includes an extension upwards, with this extension exceeding an apex of the upper part (2) of the tooling, with the extension being liable to be hammered using a manual hammer or a pneumatic, electromechanical or hydraulic hammer.

7. Tooling according to claim 6, wherein the extension is not integral with the main punch (1) but is composed of a hitting slider which is in contact at one end thereof with the main punch (1) and the other end thereof exceeding the apex of the upper part (2) of the tooling, the hitting slider being able to be hammered using a manual hammer or a pneumatic, electromechanical or hydraulic hammer.

8. Tooling according to claim 2, wherein a pneumatic, electromechanical or hydraulic hammer is mounted in the upper part (2) of the tooling so that a hitting head (8) thereof can hit, or hammer, the main punch (1) and the complementary punch (4) either directly or through a hitting slider (8') mounted between the hitting head (8) and the punches (1) and (4).

9. Tooling according to claim 2, wherein the main punch (1) includes an extension upwards, with the extension exceeding an apex of the upper part (2) of the tooling, and the extension being liable to be hammered using a manual hammer or a pneumatic, electromechanical or hydraulic hammer with the complementary punch (4) also including an extension exceeding the apex of the upper part (2) of the tooling also liable to be hit, simultaneously with the main punch (1) when the latter has driven in the staple (7) and thus apexes of both punches (1) and (4) are at the same level and are thus liable to be hit together by a manual hammer or pneumatic, electromechanical or hydraulic hammer.

10. Tooling according to claim 9, wherein the extension of the main punch exceeding the apex of the upper part (2) of the tooling is not integral with the main punch (1) but includes a slider, with said slider being intended to hit the main punch (1) then simultaneously the main punch (1) and the complementary punch (4) when this one is hit using a manual hammer or a pneumatic, electromechanical or hydraulic hammer at the end thereof which goes further than the upper part (2) of the tooling.

11. Tooling for fixing hooks connecting the ends of a belt conveyor of the type including an upper plate (5') and a lower plate (5''') connected by lugs (5'''), positioned on the ends of a conveyor belt (BT), with the lugs (5") being able to be connected after having being imbricated, by a linking and swivel rod, like a hinge, said tooling including a movable upper part (2) and a fixed lower part (3) positioned and centered with respect to each other by positioning and centering means, with the upper part (2) being able to vertically slide towards or away from the lower part (3), the lower part (3) including an anvil (3') and wedging means for the lower plate (5''') of a hook (5) positioned between the upper part (2) and the lower part (3), the upper part (2) including a vertical channel (2') for receiving a main punch (1) substantially centered above the anvil (3') and being able to be hammered, using a manual hammer or a device of the pneumatic, electromechanical or hydraulic hammer type mounted in the upper part (2) of the tooling, to drive in staples (7) engaged with capping into holes provided in the upper plate (5') of a connection hook (5) positioned astride on a rim of one end of a conveyor belt (BT) positioned between the upper part (2) and the lower part (3), then in the material of the end of the conveyor belt, with prongs thereof being further folded either under the lower plate (5''') of the hook (5) and meeting recesses having an appropriate shape provided in the anvil (3') of the lower part (3) of the tooling or under a bridge or bridges provided in the lower plate (5''') of the hook (5) with the upper part of the lower plate (5''') of the hook playing a part of an anvil, with the lower face of the lower plate (5''') of the hook resting on the anvil of the lower plate of the tooling which, in the later case, is smooth, the upper part (2) of the tooling including a second vertical channel (2''') in which a complementary punch (4) is mounted so as to be able to slide in this channel (2''') parallel to the main punch (1) while being juxtaposed next to the main punch (1), and being able to be hammered, using the manual hammer or the device of the pneumatic, eletromechanical or hydraulic hammer type mounted in the upper part (2) of the tooling, wherein the complementary punch (4) is positioned so that a lower end thereof is located above a part of the upper plate (5') of the hook (5) located between the lugs (5') and a branch of the staple (7) which is the closest to the lugs (5'''), wherein the main punch (1) includes a head (1') which forms an enlarged part (1'$b$) on the side where the complementary punch (4) is located, said enlarged part (1'$b$) being above an apex of the complementary punch (4), wherein a vertical dimension of the complementary punch (4) is substantially equal to a vertical dimension of the main punch (1) as far as the enlarged part (1'$b$), so that, when the main punch (1) has driven the staple and applied the part of the upper plate (5') of the hook (5) located under the staple (7) against the upper face of the end of the conveyor belt (BT), the enlarged part (1'$b$) of the main punch (1) hits the apex of the complementary punch (4).

\* \* \* \* \*